United States Patent
Tregenza et al.

(10) Patent No.: US 6,917,326 B1
(45) Date of Patent: Jul. 12, 2005

(54) VIBRATORY CLEANING MECHANISM FOR AN ANTENNA IN A TIME-OF-FLIGHT BASED LEVEL MEASUREMENT SYSTEM

(75) Inventors: James Edward Tregenza, Ennismore (CA); Timothy Little, Peterborough (CA)

(73) Assignee: Siemens Milltronics Process Instruments, Peterborugh (CA)

( * ) Notice: Subject to any disclaimer, the term of this patent is extended or adjusted under 35 U.S.C. 154(b) by 0 days.

(21) Appl. No.: 10/953,223

(22) Filed: Sep. 29, 2004

(51) Int. Cl.$^7$ .................. G01S 13/08; G01F 23/284
(52) U.S. Cl. ................. 342/124; 342/74; 342/118; 342/175; 342/350; 343/704; 73/290 R; 73/290 V
(58) Field of Search .................. 73/290 R, 304 R, 73/304 C, 290 B, 290 V; 367/87, 99–116, 908; 342/74, 75, 82–103, 118, 124, 175, 189–197, 350; 343/701, 704, 720, 757, 767, 772–780, 781 R, 782, 781 P, 781 CA, 783–786, 834, 840, 907, 912, 914, 915

(56) References Cited

U.S. PATENT DOCUMENTS

| | | | |
|---|---|---|---|
| 3,541,419 A | * | 11/1970 | Jansons ................ 343/766 |
| 3,719,948 A | * | 3/1973 | Mueller ................ 343/757 |
| 4,571,594 A | * | 2/1986 | Haupt ................ 343/840 |
| 5,861,839 A | * | 1/1999 | Upton et al. ........... 342/350 |

FOREIGN PATENT DOCUMENTS

| | | | | |
|---|---|---|---|---|
| DE | 004031035 A1 | | 4/1992 | |
| DE | 4217559 A1 | * | 12/1993 | ........... B08B/3/12 |
| GB | 1 222 151 | | 2/1971 | |
| GB | 1 251 745 | | 10/1971 | |
| GB | 1 369 350 | | 10/1974 | |
| GB | 2 093 636 | | 9/1982 | |
| JP | 358206204 A | | 12/1983 | |
| JP | 402100403 A | | 4/1990 | |
| JP | 405175715 A | | 7/1993 | |
| JP | 409331203 A | | 12/1997 | |
| WO | WO-0214804 A1 | * | 2/2002 | ........ G01F/23/284 |

* cited by examiner

Primary Examiner—Bernarr E. Gregory
(74) Attorney, Agent, or Firm—Workman Nydegger

(57) ABSTRACT

An antenna assembly for use with a level measurement device for measuring the level of a material held in a container is provided. The antenna assembly includes an upper section for coupling to the level measurement device, and an antenna for transmitting energy pulses emitted by the level measurement device and receiving energy pulses reflected by the material in the container. A transducer module is disposed between the upper section and the antenna. A controller is operably connected to the transducer module, the transducer module being responsive to control signals of the controller for activating the transducer module such that the transducer module, when activated by the controller, vibrates the antenna to dislodge or remove material adhering to the antenna.

20 Claims, 7 Drawing Sheets

FREQ. = $\dfrac{1.44}{(R_1 + R_2)C}$

FREQ. = $\dfrac{0.7}{R_1 C}$

VIBRATORY CLEANING MECHANISM FOR AN ANTENNA IN A TIME-OF-FLIGHT BASED LEVEL MEASUREMENT SYSTEM

FIELD OF THE INVENTION

The present invention relates to level measurement systems, and more particularly to a vibratory cleaning mechanism for an antenna in a time-of-flight based level measurement system.

BACKGROUND OF THE INVENTION

Time-of-flight level measurement systems are used to determine the distance to a reflective surface (i.e. reflector) by measuring the time elapsed between the transmission of a signal towards a target and the return of the signal (i.e. echo) to the device. Time-of-flight level measurement systems may utilize ultrasonic pulses, pulse radar signals, or microwave energy signals.

Pulse radar and microwave-based level measurement systems are typically preferred in applications where the atmosphere in the container or vessel is subject to large temperature changes, high humidity, dust and other types of conditions which can affect signal propagation. To provide a sufficient receive response, a high gain antenna is typically used. High gain usually translates into a large antenna size.

Two types of antenna designs are typically found in radar-based and microwave-based level measurement systems: rod antennas and horn antennas. Rod antennas have a narrow and elongated configuration and are suitable for containers having small opening/flange sizes and sufficient height for accommodating the antenna. Horn antennas, on the other hand, are wider and shorter than rod antennas. Horn antennas are typically used in installations with space limitations, for example, vessels or containers which are shallow.

The level measurement instrument or device comprises a housing and an waveguide such as an antenna. The level measurement device is mounted on top of a container or vessel containing a material with the antenna extending into the interior of the vessel. The level measurement instrument is typically bolted to a flange around an opening in the top of the container. The instrument housing holds the electronic circuitry for transmitting and receiving the signal, calculating the time elapsed between transmission and reception of the signal, and determining the distance to the surface of the material. The antenna is coupled to a transducer in the instrument housing. When the transducer is excited by the control circuitry, the antenna transmits electromagnetic energy pulses into the vessel, and receives pulses that are reflected back from the surface of the material contained in the vessel.

The material contained in the vessel often sticks to horn antennas of level measurement devices. A build-up of material on the inside of a horn antenna prevents efficient signal transmission and also causes "noise" in received signals. This build-up of material can cause false measurements or signal loss. If the materials adhered to the inner surface of the horn antenna are removed by cleaning, normal signal transmission and reception is returned and proper measurement can again be obtained from the level measurement device.

One method of cleaning is to manually clean the horn antenna. This involves removing the level measurement device from service and cleaning it with brushes, scrapers, or the like, and then re-installing the cleaned device. This is time consuming, costly, and sometimes unsafe. Another option used for periodic cleaning is air or liquid purging. This involves connecting an air or liquid supply to the top side of the horn antenna (for example, through an inlet on the mounting flange) and activating the purging cycle manually or automatically, for example using a solenoid valve. The air or liquid passes through to the inside of the horn antenna and flushes it out. While effective, this technique requires air or water to be supplied to the level measurement device which can be problematic in some applications. Air and/or water supply is usually not available at the top of the container. Thus, an air or water line must be installed which is costly to implement. Typically, compressed air is used for purging because most solid applications cannot tolerate water inside the vessel. Compressed air, however, is relatively costly to produce for continuous process requirements.

Accordingly, there remains a need for a cleaning mechanism for level measurement systems, in particular radar-based and microwave-based, which addresses these deficiencies.

SUMMARY OF THE INVENTION

The present invention provides a vibratory cleaning mechanism for an antenna in time-of-flight or level measurement systems.

The vibratory cleaning mechanism provides a transducer coupled to the level measurement device in such a manner that, when excited, causes the radar antenna to vibrate. This vibration creates a cleaning action by causing solids or liquids adhered to the inner surface of the antenna to dislodge or fall off, improving the measurement signal.

According to one aspect, the present invention provides a level measurement apparatus for determining the level of a material received in a container. The apparatus comprises an enclosure containing, a transducer having a transmitter module for emitting energy pulses and a receiver module for receiving reflected energy pulses; a controller operably coupled to the transducer, the transmitter module being responsive to control signals of the controller to emit energy pulses, the receiver module being responsive to reflected energy pulses, the receiver module converting the reflected energy pulses into a corresponding electrical signal; an antenna coupled to the enclosure for transmitting the energy pulses emitted by the transducer and receiving energy pulses reflected by the material in the container; a vibratory cleaning module coupled to the level measurement apparatus for vibration of the antenna; and a vibratory controller unit operably connected to the vibratory cleaning module, the vibratory cleaning module being responsive to control signals of the vibratory controller unit for activating the vibratory cleaning module, when activated by the vibratory controller unit vibrates the antenna at an amplitude sufficient to remove material adhered to the antenna.

According to another aspect, the present invention provides an antenna assembly for use with a level measurement device for measuring the level of a material stored in a container. The antenna assembly comprises an upper section for coupling to the level measurement device; an antenna for transmitting energy pulses emitted by the level measurement device and receiving energy pulses reflected by the material in the container; a transducer module disposed between the upper section and the antenna; and a controller operably connected to the transducer module, the transducer module being responsive to control signals of the controller for activating the transducer module for vibrating the antenna to dislodge or remove material adhered to the antenna.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is next made to the accompanying drawings which show, by way of example, embodiments of the present invention and in which.

DETAILED DESCRIPTION OF EMBODIMENTS OF THE INVENTION

Figure 2:
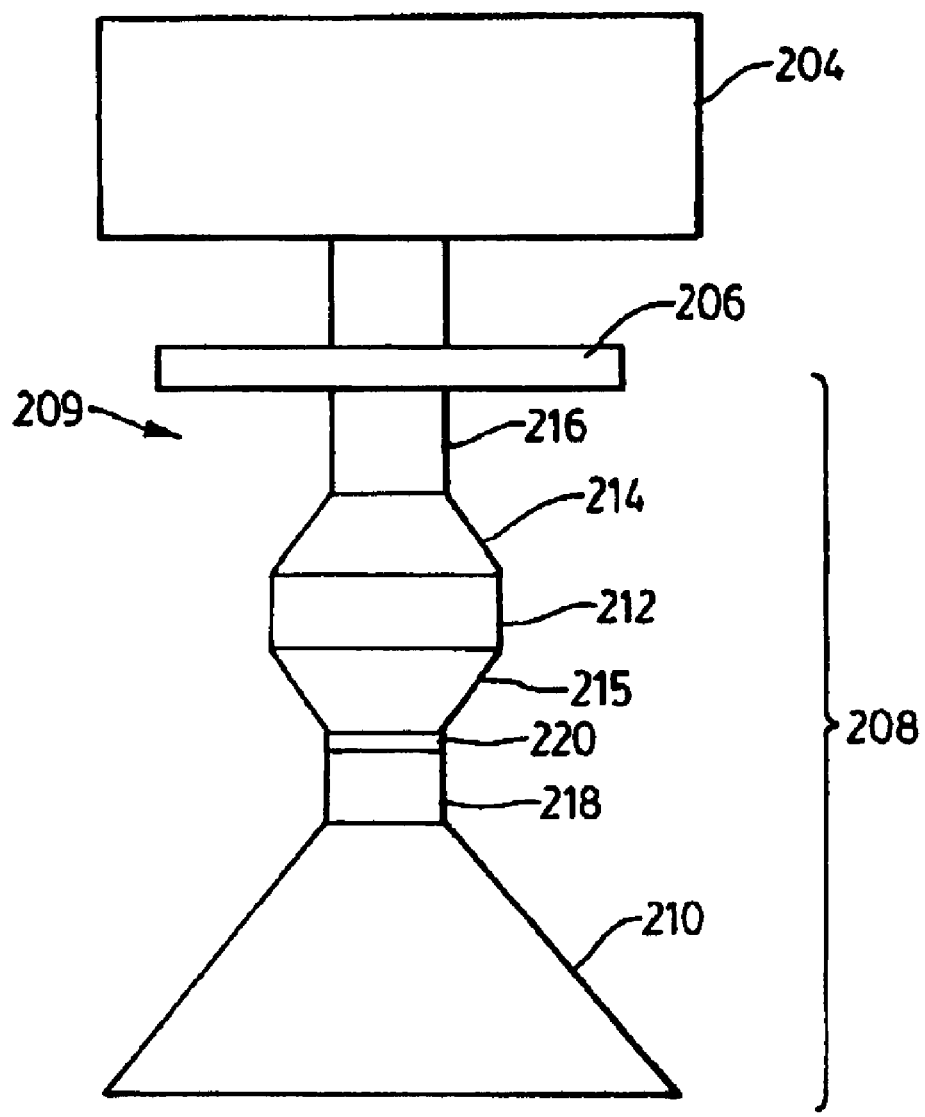
FIG. 2 shows in diagrammatic form a level measurement apparatus having a radially mounted vibratory cleaning mechanism according to the present invention.
Figure 11:
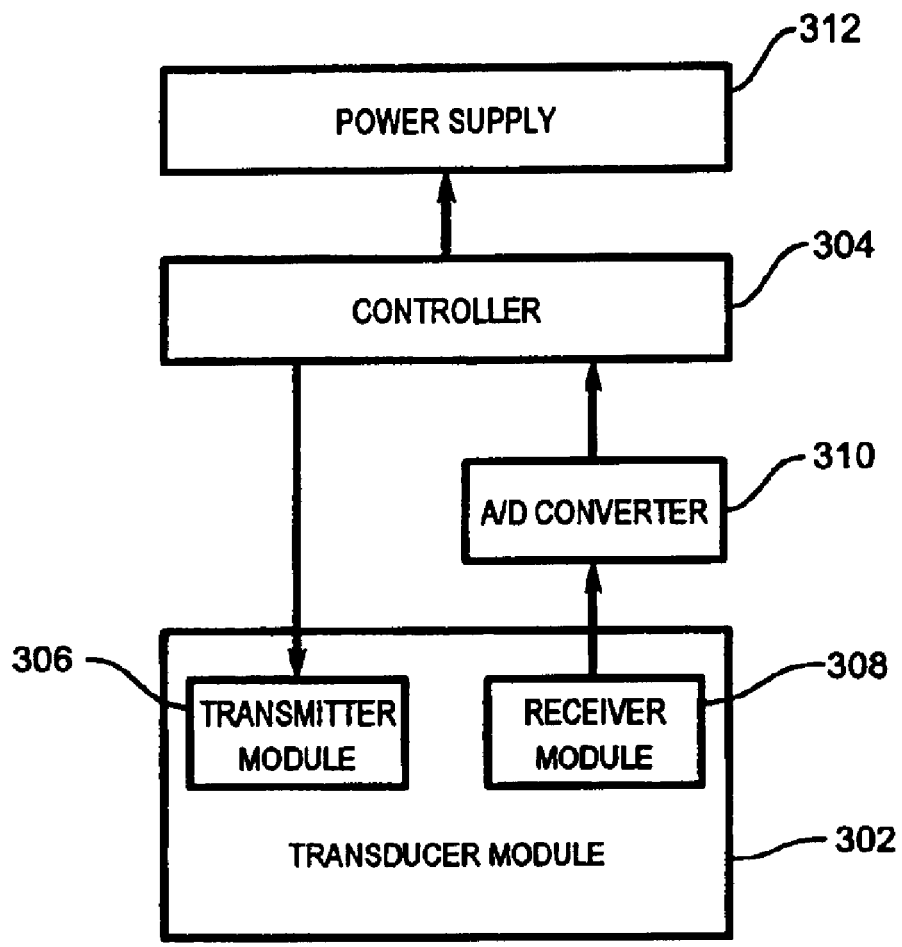
FIG. 11 shows a level measurement system.

Reference is first made to FIG. 2 which shows in diagrammatic form a level measurement apparatus 200 with a radially mounted vibratory cleaning mechanism according to the present invention. The level measurement apparatus 200 comprises a level measuring device having a housing or enclosure 204 which contains electronic control circuitry such as shown in FIG. 11, and described more fully below, and an antenna assembly 208.

The level measurement apparatus 200 is mounted on top of a container or vessel (not shown) with the antenna assembly 208 extending into the interior of the container. The level measurement apparatus 200 is mounted to a flange (not shown) around an opening in the top of the container using bolts (not shown) or the like. The container contains a material, such as a liquid, solid or slurry, with a level determined by the top surface of the material. The top surface of the material provides a reflective surface or reflector for reflecting energy pulses emitted by measurement apparatus 200, i.e. the antenna assembly 208. The level measurement apparatus 200 functions to determine the level of the material held in the container as will be described in more detail below. In other embodiments, the level measurement apparatus 200 may be adapted for mounting to a side opening in the container.

Referring to FIG. 2, the antenna assembly 208 comprises an upper section 209 for coupling to the enclosure 204 and including a mounting flange 206, a horn antenna 210, a vibratory cleaning module or transducer module 212, and upper and lower threaded shoulders 214 and 215 respectively. A conduit 216 provides electrical connections for the transducer module 212. The antenna assembly 208 may also include a waveguide extension 218. An antenna flange 220 connects the waveguide extension 218 to the lower threaded shoulder 215. In the embodiment as shown, a conventional horn antenna 210 is used. The horn antenna 210 can be configured in its geometry as a truncated cone, an exponential horn, a rectangular horn, or other desired configuration. The mechanical properties of the present invention are particularly advantageous for use with horn antennas, although the present invention can also be used with other types of antennas, for example rod antennas or wave guide extensions. In such applications, the vibratory cleaning mechanism of the present invention would have to be tuned for the particular antenna.

Figure 3:
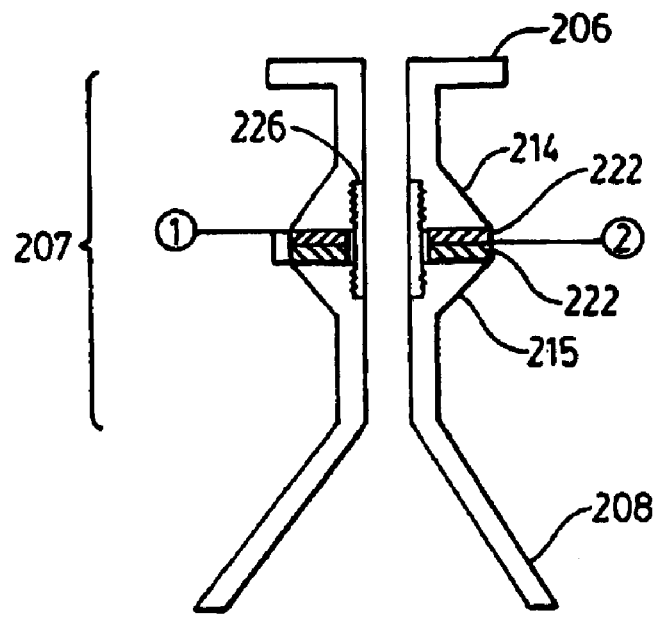
FIG. 3 shows a cross-sectional view of the lower portion of the level measurement apparatus of FIG. 2 showing the components of vibratory cleaning mechanism.
Figure 4:
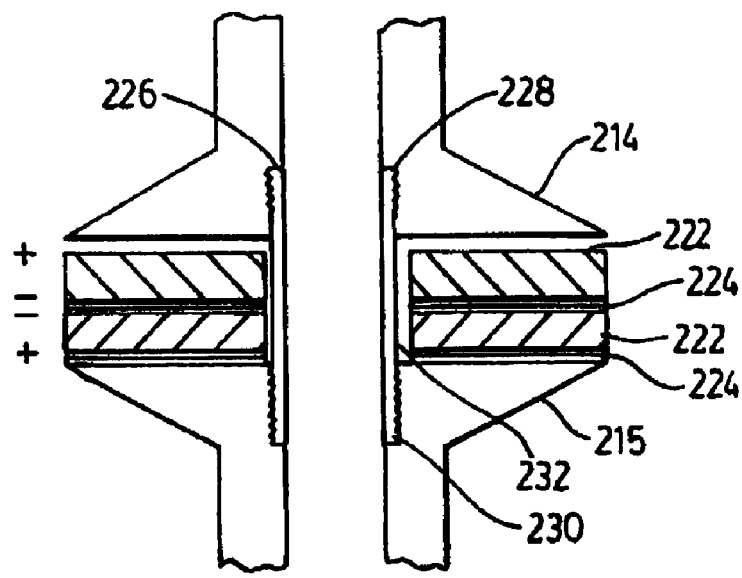
FIG. 4 shows an enlarged view of the piezoelectric rings of the vibratory cleaning mechanism of FIG. 3.

Referring now to FIG. 3 and 4, the transducer module 212 will be described in more detail. The transducer module 212 comprises upper and lower piezoelectric rings 222 formed from piezoelectric crystals and having a ceramic polarity, for example, as depicted. A conductive shim 224 is positioned between the piezoelectric rings 222 and beneath the lower piezoelectric ring 222. The shims 224 provide electrical current to both sides of the piezoelectric rings 222. A hollow connector 226 having an upper threaded portion 228 and lower threaded portion 230 connects the transducer module 212 to the internal threads of the upper and lower shoulders 214 and 215 respectively. The hollow connector 226 also includes an unthreaded portion 232 disposed intermediate the upper and lower threaded portions 228 and 230. The piezoelectric rings 222 are fitted circumferentially around an outer surface of the unthreaded portion 232.

The threaded connection provides a means to clamp the piezoelectric rings 222 and provide good mechanical contact so that the acoustic waves emitted propagate through the horn antenna 210 causing at least some of the process materials to be dislodged or removed from the inner surface of the horn antenna 210. The frequency of the vibration may be tuned to the natural resonance frequency of the antenna 210 or the size and shape of the horn antenna 210 as discussed more fully below. In some applications the frequency and/or amplitude of the vibration may be adjusted or tuned to allow optimum performance for the material to be removed from the antenna 210.

The hollow connector 226 has an inner surface which aligns with the inner surface of the antenna assembly 208 and- is adapted to transmit the energy pulses of the level measuring device or apparatus. The inner surface of the antenna assembly 208 provides a resonator or waveguide 207 for the energy pulses of the level measuring device.

The transducer module 212 can be manufactured as a separate module connectable between the mounting flange 206 and the antenna flange 220, or it can be manufactured as an integral component to the horn antenna 210.

In some applications, the vibration of the horn antenna 210 causes solid particles, moisture-laden solids, and even some sticky liquids to be driven off, or dislodged from, the horn antenna 210 improving the measurement signal and minimizing or in some cases preventing costly maintenance. The installation cost and long term operating costs of this vibratory cleaning mechanism will typically be less than using a purging system or manually cleaning the antenna.

The piezoelectric rings 222 are coupled to controller such as an electronic control circuit. The electronic control circuit is contained in the enclosure 204 with electrical connections to the transducer module 212 passing through the conduct 216. The conduit 216 isolates the electrical wiring and connections from the process, allowing installation in a hazardous environment. An example of an electronic control circuit 231 suitable for controlling the transducer module 212 is shown generally in FIG. 5. The electronic control circuit 231 comprises a gated oscillator 234, a power amplifier 236, and a step-up transducer 238. The electronic control circuit 231 provides a means for obtaining a high voltage pulse for energizing the piezoelectric rings 222.

The electronic control circuit 231 may be configured to provide the voltage required to obtain the desired vibration amplitude and/or the pulse frequency required to obtain the desired vibration frequency. In most applications, the vibration frequency is matched with the horn antenna material, length, and shape (i.e. the natural resonance frequency of the antenna 210) to produce a vibration frequency and/or amplitude sufficient to remove solids, moisture-laden solids, and in some application even sticky liquids adhered to the inner surface of the horn antenna 210. The electrical pulse can be activated using control software in the level measurement apparatus 200 allowing the transducer to be activated continuously, on command, or intermittently, for example at timed intervals. By programming the level measurement apparatus 200, the transducer can be fired at periodic intervals such as, for example, once per hour for 5 seconds.

Exemplary embodiments of power amplifiers and oscillators for the electronic control circuit 231 are shown in the circuit diagrams of FIGS. 6 to 9 and 10 to 11 respectively. The shown embodiments and suitable variations thereof will be understood by persons skilled in the art. As will also be appreciated by persons skilled in the art, there are many ways to generate a timed pulse of desired voltage, and the shown embodiments are meant to be merely illustrative, the present invention not being limited to any particular electronic control circuit configuration.

The oscillator 234 may be any oscillator capable of driving a FET (field-effect transistor) or logic drivers, for example a "555" oscillator or "555-timer". 555-timer configurations are well known and within the understanding of those skilled in the art. The oscillator frequency may be set to match the material, length, and shape (i.e. the natural resonance frequency of the antenna 210) of the horn neck, or other frequency effective at cleaning the horn antenna 210. In some embodiments, the resonant inductance of the transformer 238 is selected to resonate with the piezoelectric rings 222 to increase the output power. In other embodiments, a SCR (silicon-controlled rectifier) could be used to transmit a single voltage pulse to excite the piezoelectric rings 222.

Figure 5:
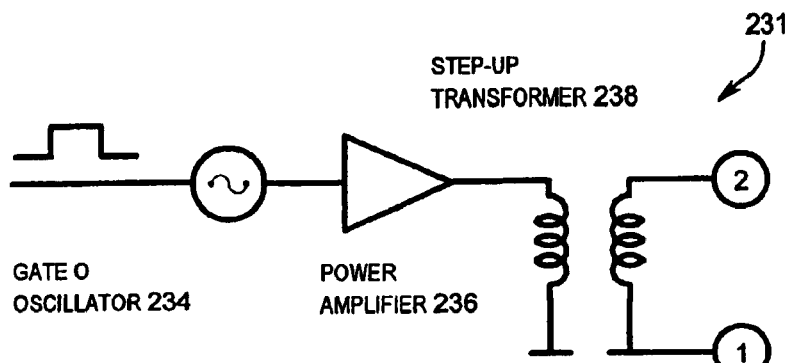
FIG. 5 shows in schematic form a control circuit for the vibratory cleaning mechanism according to the present invention.
Figure 6:
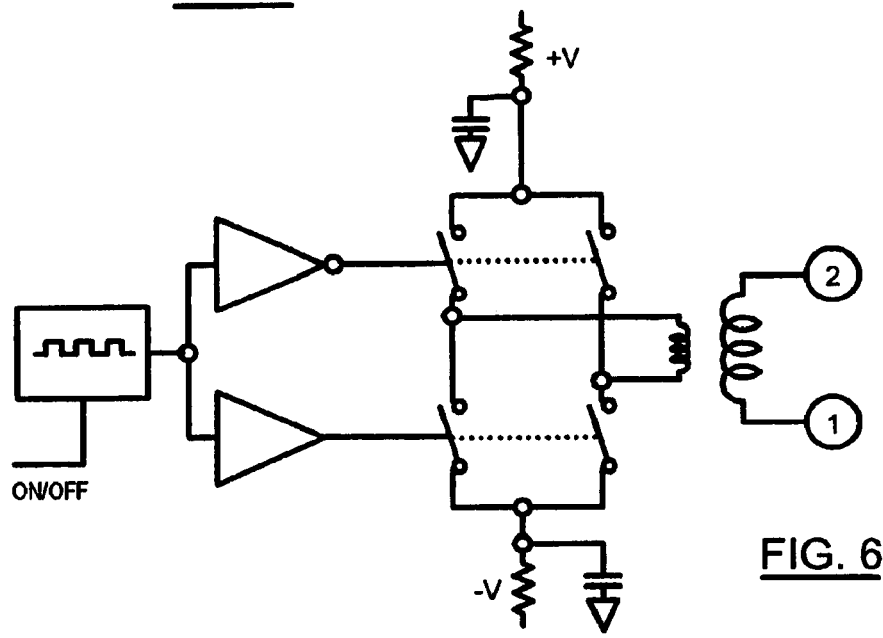
FIG. 6 is a circuit diagram of a first embodiment of a power amplifier for the control circuit of FIG. 5.
Figure 7:
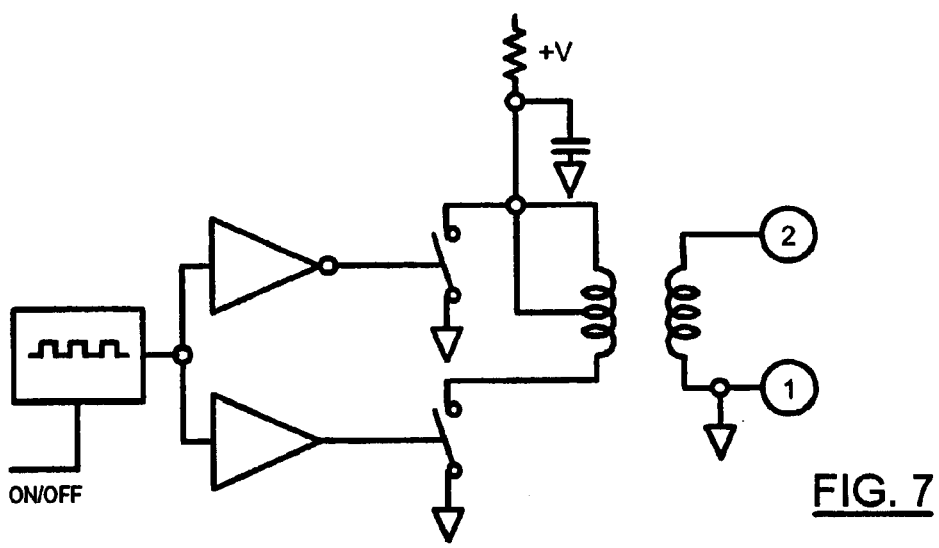
FIG. 7 is a circuit diagram of a second embodiment of a power amplifier for the control circuit of FIG. 5.
Figure 8:
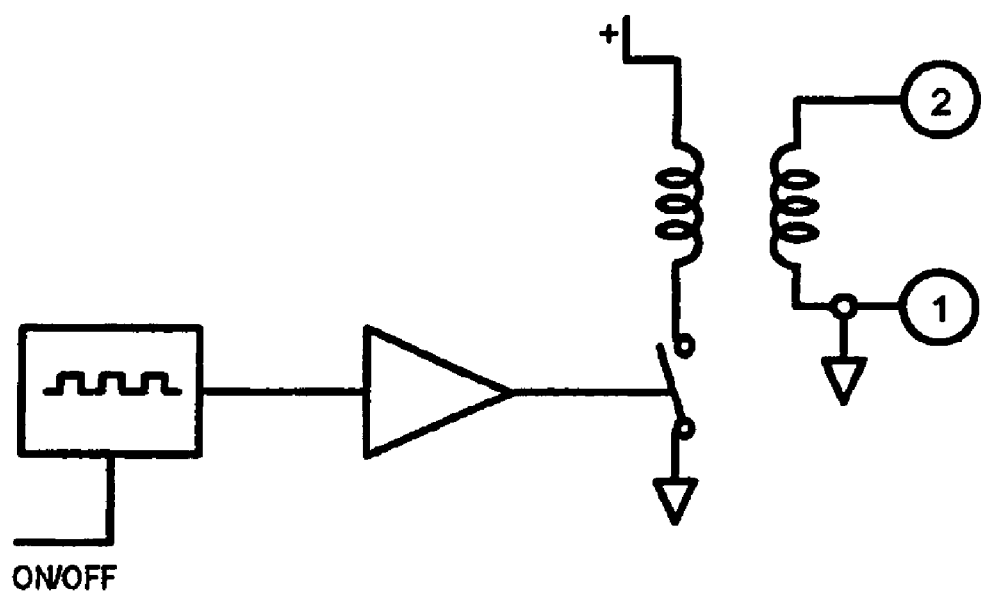
FIG. 8 is a circuit diagram of a third embodiment of a power amplifier for the control circuit of FIG. 5.

Referring to FIG. 6 to 6, three embodiments of a power amplifier for the control circuit of FIG. 5 are shown. FIG. 6 shows a circuit which provides a symmetric drive signal with a simple transformer and which requires additional driver elements. FIG. 7 shows a circuit which provides a symmetric drive signal with only two drive elements and which requires a centre top transformer. FIG. 8 shows a circuit which provides a simple, non-symmetrical circuit. This circuit has a lower efficiency than the circuits of FIG. 6 or 7 (having a drive on only one phase of the drive signal) but has a lower cost The switches may be implemented using MOFSETs (metal-oxide semiconductor field-effect transistors), power transistors or other suitable switch implementations.

Figure 9:
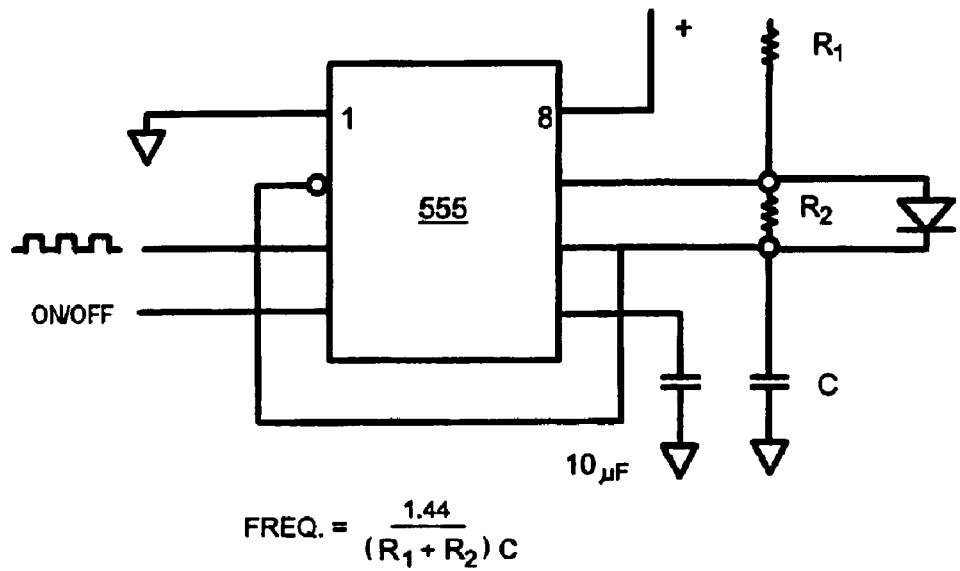
FIG. 9 is a circuit diagram of a first embodiment of an oscillator for the control circuit of FIG. 5.
Figure 10:
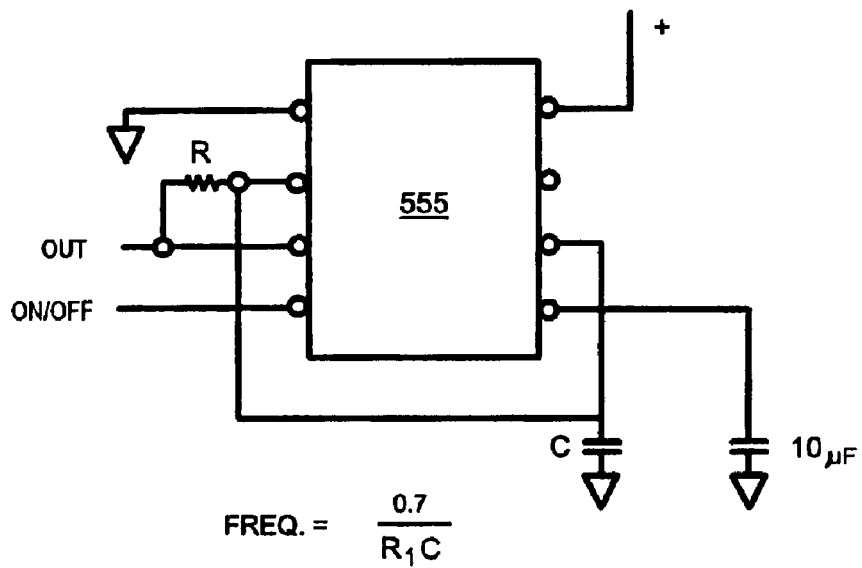
FIG. 10 is a circuit diagram of a second embodiment of an oscillator for the control circuit of FIG. 5.

Referring to FIG. 9 and 10, two embodiments of a "555" oscillator for the control circuit of FIG. 5 are shown. The output frequency of the oscillator of FIG. 9 depends on the resistance of resistors $R_1$ and $R_2$, and the capacitance of the capacitor C, and is determined according to the following equation:

$$Freq. = \frac{1.44}{(R_1 + R_2)C}$$

This oscillator has a 50% duty cycle. The output frequency of the oscillator of FIG. 10 depends on the resistance of resistor $R_1$ and the capacitance of the capacitor C, and is determined according to the following equation:

$$Freq. = \frac{0.7}{R_1 C}$$

This oscillator has a duty cycle that is below 50%. In some embodiments, the vibration frequency of the vibratory cleaning unit or transducer module ranges between 20 kHz and 50 kHz (i.e. above 20 kHz and the audible range).

Referring now to FIG. 11, the electronic control circuitry of the level measurement device will be described in more detail. The enclosure 204 contains a transducer 302 having a transmitter module 306 and a receiver module 308, a controller 304, an analog-to-digital (A/D) converter 310, and a power supply 312. The transducer 302 may be implemented using radar-based technology, ultrasonic based technology, TDR-based technology (Time Domain Reflective), or other distance ranging technology. The transducer 302 is coupled to the controller 304 through the transmitter module 306 and the receiver module 308.

Under the control of a program stored in memory (i.e. firmware), the controller 304 generates a transmit pulse control signal for the transmitter module 306 to activate (energize) the transducer 302. The transducer 302 emits a transmit burst of energy, for example, radar pulses or microwaves directed at the surface of the material contained in the container. The reflected or echo pulses, i.e. the pulses reflected by the surface of the material in the container, are received by the receiver module 308, for example, via the horn antenna 210), and are converted into electrical signals. The electrical signals are inputted by the controller 304, and are then sampled and digitized by the AID converter 310 and a receive echo waveform or profile is generated. The controller 304 also includes an evaluation component or module (not shown) such as a program that identifies and verifies the echo pulse and calculates the range, i.e. the distance to the reflective surface, based on the speed of sound at the process conditions within the container and the time elapsed between the transmission and return of the energy pulses. From this calculation, the distance to the surface of the material and thereby the level of the material in the vessel is determined. The controller 304 may comprise a microprocessor or a microcontroller, with on-chip resources, such as the A/D converter, ROM (EPROM), RAM. The microprocessor or microcontroller is suitably programmed to perform these operations as will be within the understanding of those skilled in the art. Some of these techniques are described in prior patents of which U.S. Pat. No. 4,831,565 and U.S. Pat. No. 5,267,219 are exemplary.

Figure 1:
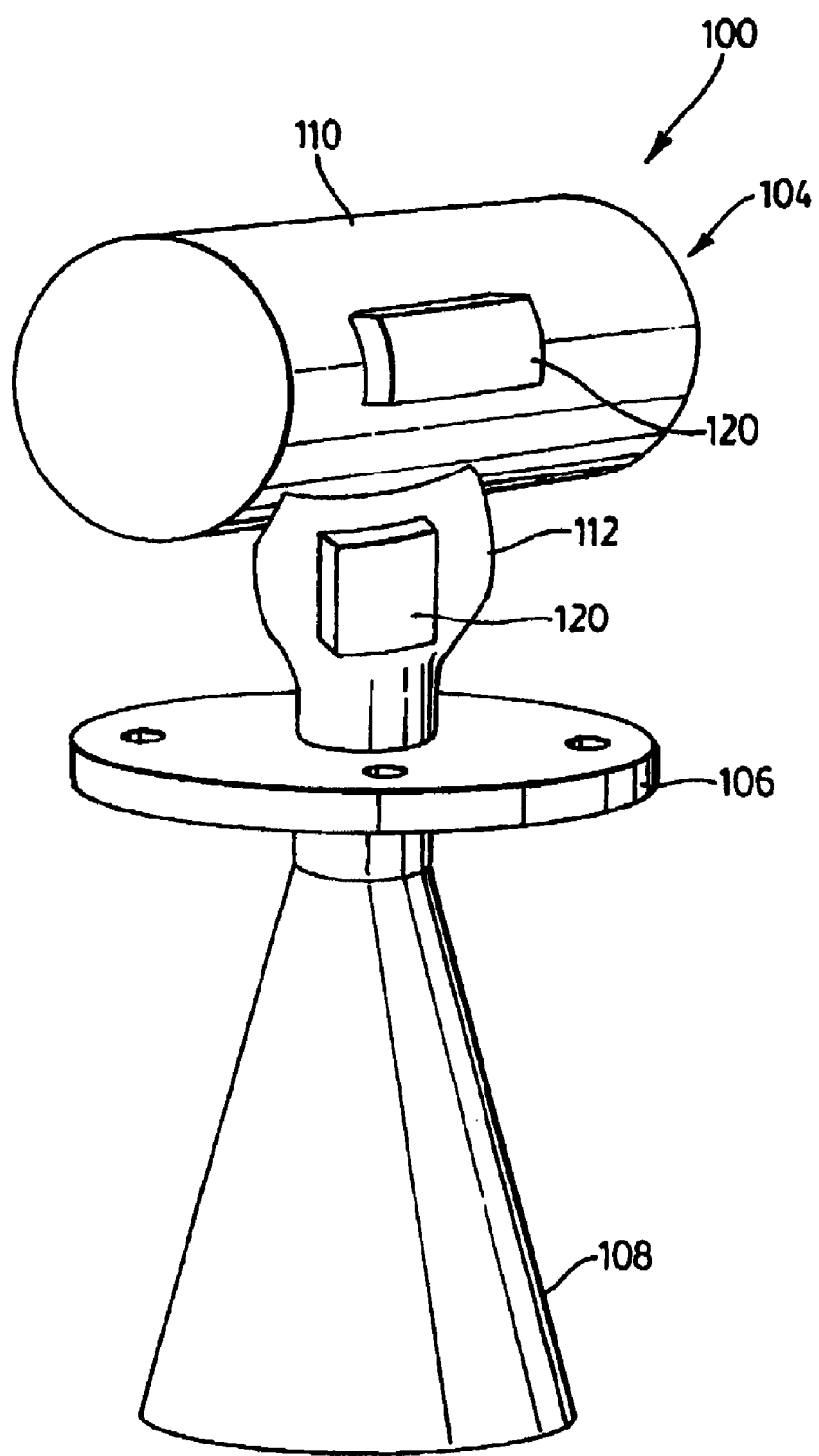
FIG. 1 shows in diagrammatic form a level measurement apparatus having an instrument mounted vibratory cleaning mechanism according to the present invention.

Reference is next made to FIG. 1, which shows in diagrammatic form a radar-based or microwave-based level measurement apparatus 100 with an instrument mounted vibratory cleaning mechanism according to the present invention. The level measurement apparatus 100 comprises a level measuring device having a housing or enclosure 104 which contains electronic control circuitry (FIG. 11) as described above, a mounting flange 106, and an antenna 108 such as a horn antenna. In the shown embodiment, a conventional horn antenna 108 is used. The horn antenna 108 may be configured in its geometry as a truncated cone, an exponential horn, a rectangular horn, or other desired configuration. The enclosure 104 has a head portion 110 and a neck portion 112. The level measurement apparatus 100 is mounted on top of a container or vessel containing a material as described above.

A vibratory cleaning module 120 is coupled to the enclosure 104. The vibratory cleaning module 120 may be mounted to the head portion 110 or neck portion 112 of the enclosure 104. In some embodiments, a vibratory cleaning module 120 may be mounted on both the head portion 110 and neck portion 112 of the enclosure 104. The vibratory cleaning module. 120 Is mounted using screws, adhesive or other suitable means. The vibratory cleaning module 120 includes a transducer (not shown) such as piezoelectric crystal or other vibratory device (e.g. rotating eccentric).

The vibratory cleaning module 120 is operably connected to a vibratory controller unit (not shown) such as an electronic control circuit contained in the enclosure 104. The vibratory controller unit generates control signals (a high voltage pulse) for activating (energizing) the vibratory cleaning module 120. The high voltage pulse is transmitted to the transducer in the vibratory cleaning module 120 using external or internal electrical wire connections (not shown). Thus, the electrical connections to the vibratory cleaning module 120 are outside of the process, thereby reducing the risk of hazardous ignition. The electrical connections to the vibratory cleaning module 120 may also be provided through the wall of the enclosure 104 to a connection internal to the enclosure 104.

The vibratory controller unit generates the control signals (a high voltage pulse) according to control software (i.e. firmware) stored in the level measurement apparatus 100. The transducer converts the high voltage pulse into a mechanical vibration causing the level measurement apparatus 100 to vibrate. This vibration propagates to the horn antenna 108 causing it to vibrate at an amplitude sufficient to remove process materials adhered to the inner surface of the antenna 108. The frequency and/or amplitude of the vibration is tuned to the natural resonance frequency of the antenna 108 or size and shape of the level measurement apparatus 100 and the horn antenna 108. In some applications, the frequency and amplitude of the vibration can be tuned to allow optimum performance for the material to be removed from the antenna 108.

The present invention may be embodied in other specific forms without departing from the spirit or essential characteristics thereof. Certain adaptations and modifications of the invention will be obvious to those skilled in the art. Therefor, the presently discussed embodiments are considered to be illustrative and not restrictive, the scope of the invention being indicated by the appended claims rather the foregoing description, and all changes which come within the meaning and range of equivalency of the claims are therefore intended to be embraced therein.

What is claimed is:

1. A level measurement apparatus for determining the level of a material held in a container, the apparatus comprising:

an enclosure containing, a transducer having a transmitter module for emitting energy pulses and a receiver module for receiving reflected energy pulses;

a controller operably coupled to the transducer, the transmitter module being responsive to control signals of the controller to emit energy pulses, the receiver module being responsive to reflected energy pulses, the receiver module converting the reflected energy pulses into a corresponding electrical signal;

an antenna coupled to the enclosure for transmitting the energy pulses emitted by the transducer and receiving energy pulses reflected by the material in the container;

a vibratory cleaning module coupled to the level measurement apparatus for vibration of the antenna; and a vibratory controller unit operably connected to the vibratory cleaning module, the vibratory cleaning module being responsive to control signals of the vibratory controller unit for activating the vibratory cleaning module, when activated by the vibratory cleaning module vibrates the antenna to remove material adhered to the antenna.

2. The level measurement apparatus as claimed in claim 1, wherein the vibratory cleaning module comprises a transducer, the vibratory cleaning module being mounted to the enclosure.

3. The level measurement apparatus as claimed in claim 2, wherein the enclosure includes a head portion and a neck portion, the vibratory cleaning module being mounted to an outer surface of the head portion or neck portion of the enclosure.

4. The level measurement apparatus as claimed in claim 3, wherein the vibratory controller unit generates a high voltage energy pulse for vibrating the vibratory cleaning module.

5. The level measurement apparatus as claimed in claim 4, wherein the antenna comprises a horn antenna.

6. The level measurement apparatus as claimed in claim 1, wherein the vibratory cleaning module comprises at least one piezoelectric ring coupled to the antenna, when activated the vibrations of the piezoelectric ring are transmitted to the antenna to dislodge material adhering to the antenna.

7. The level measurement apparatus as claimed in claim 1, wherein the vibratory cleaning module comprises a pair of piezoelectric rings disposed between the antenna and the enclosure, when activated the vibrations of the piezoelectric rings are transmitted to the antenna to dislodge material adhering to the antenna.

8. The level measurement apparatus as claimed in claim 7, wherein the vibratory controller unit generates a high voltage energy pulse for vibrating the piezoelectric rings.

9. The level measurement apparatus as claimed in claim 1, wherein the vibration frequency of the vibratory cleaning unit is set to the resonant frequency of the antenna or some other optimized frequency.

10. The level measurement apparatus as claimed in claim 9, wherein the vibration frequency of the vibratory cleaning unit is between 20 kHz and 50 kHz.

11. An antenna assembly for use with a level measurement device for measuring the level of a material stored in a container, the antenna assembly comprising:

an upper section for coupling to the level measurement device;

an antenna for transmitting energy pulses emitted by the level measurement device and receiving energy pulses reflected by the material in the container;

a transducer module disposed between the upper section and the antenna; and a controller operably connected to the transducer module, the transducer module being responsive to control signals of the controller for activating the transducer module, wherein the transducer module, when activated by the controller, vibrates the antenna to dislodge material adhering to the antenna.

12. The antenna assembly as claimed in claim 11, wherein the transducer module comprises at least one piezoelectric ring coupled to the antenna, when activated vibrations from the piezoelectric ring are transmitted to the antenna to dislodge material adhered to the antenna.

13. The antenna assembly as claimed in claim 11, wherein the transducer module comprises:

a hollow connector having an inner surface adapted to transmit energy pulses of the level measuring device, upper and lower threaded portions, and an unthreaded portion disposed between the upper and lower threaded portions, the upper threaded portion of the connector being connected to a threaded portion of the upper section, the lower threaded portion of the connector being connected to a thread portion,.of an intermediate mounting member; and upper and lower piezoelectric rings fitted around an outer surface of the unthreaded portion of the connector.

14. The antenna assembly as claimed in claim 13, further comprising:

a conductive shim disposed between the upper and lower piezoelectric rings; and a conductive shim disposed below the lower piezoelertric ring.

15. The antenna assembly as claimed in claim 14, wherein the vibration frequency of the transducer module is set to the resonant frequency of the antenna or some other optimized frequency.

16. The antenna assembly as claimed in claim 13, wherein the controller generates a high voltage energy pulse for vibrating the piezoelectric rings.

17. The antenna assembly as claimed in claim 11, wherein the controller generates a high voltage energy pulse for vibrating the transducer module.

18. The antenna assembly as claimed in claim 17, wherein the antenna comprises a horn antenna.

19. The antenna assembly as claimed in claim 11, wherein the vibration frequency of the transducer module is set to the resonant frequency of the antenna or some other optimized frequency.

20. The antenna assembly as claimed in claim 15 or 19, wherein the vibration frequency of the transducer module is between 20 kHz and 50 kHz.

* * * * *